Jan. 21, 1941. C. E. PARKER 2,229,518
BROILER
Filed Aug. 11, 1939 2 Sheets-Sheet 1

INVENTOR
Claude E. Parker
By Parker, Carton, Pitzner & Hubbard
ATTORNEYS

Jan. 21, 1941.  C. E. PARKER  2,229,518
BROILER
Filed Aug. 11, 1939  2 Sheets-Sheet 2
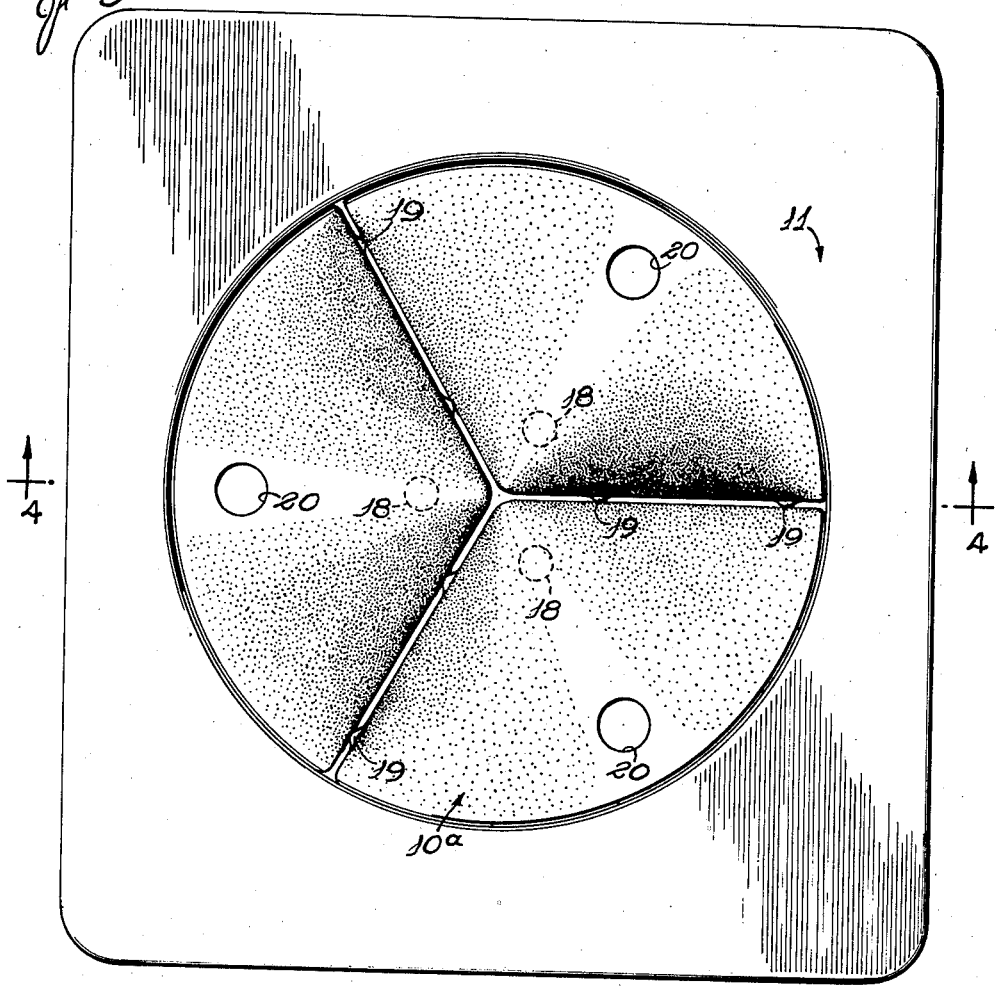
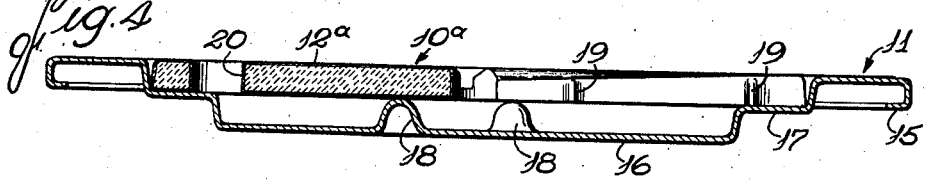

Patented Jan. 21, 1941

2,229,518

UNITED STATES PATENT OFFICE 2,229,518

BROILER

Claude E. Parker, Chicago, Ill., assignor to Gas Products Corporation, Chicago, Ill., a corporation of Illinois Application August 11, 1939, Serial No. 289,527

3 Claims. (Cl. 53—5)

The present invention relates to broilers and has particularly to do with improvements in food supports for use in broilers. Broiler food supports embodying the present invention find particular, though by no means exclusive, utility in broilers embodying a heat conservation dome of the type disclosed in Claude E. Parker Patent No. 2,102,482 issued December 14, 1937.

One object of the present invention is to provide a broiler food support which effectually conserves the heat directed on it from the broiler heat source and which confines such heat to the food being broiled, thereby achieving a high broiling temperature and maximum thermal efficiency.

Another object is to provide a novel food support characterized not only by high thermal efficiency but also by extreme cleanliness and pleasing appearance.

Further objects and advantages of the invention will become apparent as the following description proceeds, taken in connection with the accompanying drawings in which:

Fig. 3 is a plan view of a modified form of broiler food support embodying the invention.

Fig. 4 is a transverse sectional view along the line 4—4 in Fig. 3.

Though but two forms of the invention have been illustrated and described herein, it is susceptible of a wide variety of embodiments. Accordingly, even though certain particular embodiments of the invention have been shown and described in some detail there is no intention to thereby limit the invention to such embodiments but on the other hand the appended claims are intended to cover all modifications and alternative constructions falling within the spirit and scope of the invention.

Figure 1:
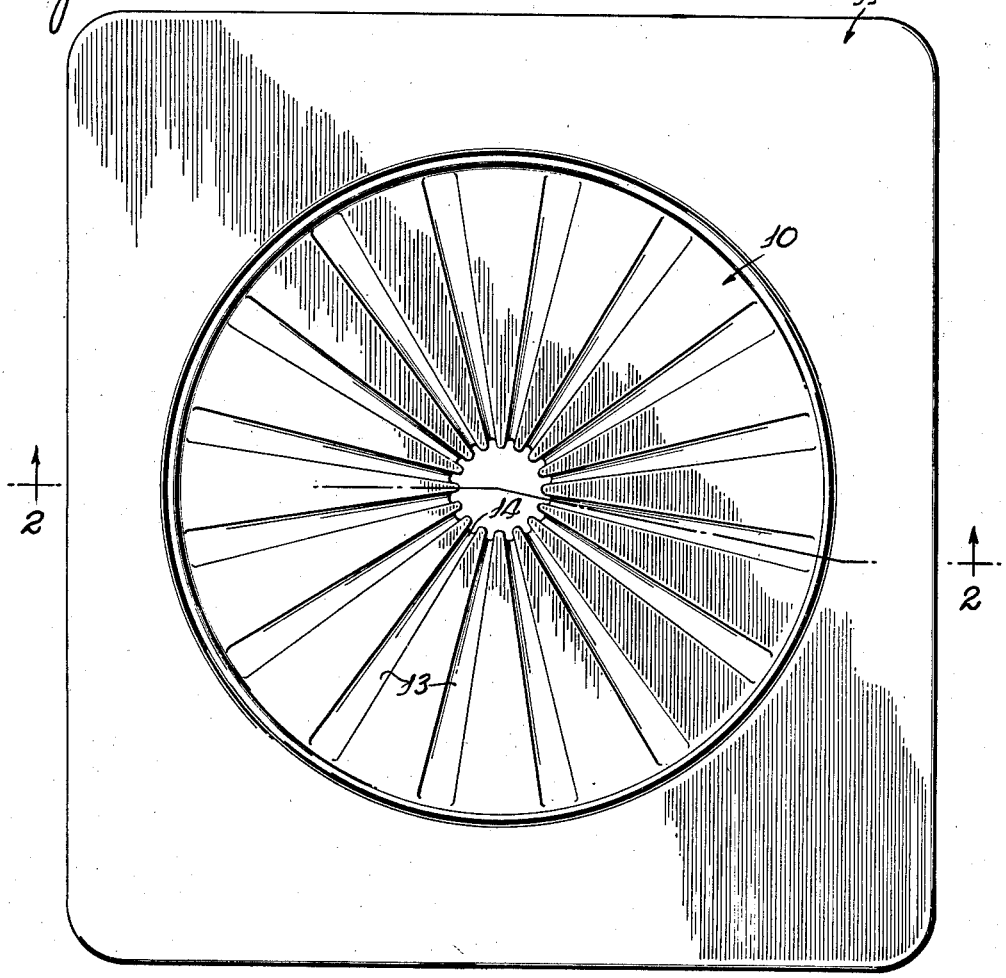
Figure 1 is a plan view of a broiler food support embodying the invention.

In the first embodiment (Fig. 1), the device comprises but two parts which are respectively a slab or plate member 10, preferably made of ceramic material and on which the food to be broiled is placed, and a pan 11 which constitutes not only a support for the ceramic plate but also forms a drip receptacle beneath it. The minimization in number, and simplicity in form, of the parts of the device are, in fact, among its prime virtues because of the low manufacturing cost which results.

Figure 2:
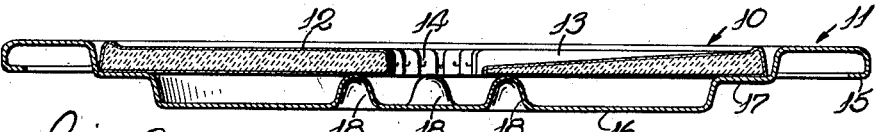
Fig. 2 is a transverse sectional view along the line 2—2 in Fig. 1.

The plate 10 is disk shaped in form and presents a generally flat top surface which is hard, smooth, impervious to moisture, stain-proof, highly heat resistant, and does not crumble or powder. This food supporting plate is able to withstand not only mechanical shock but extreme heat shocks as well. For example, it may be heated to a red heat and plunged into ice water without injuring it. Consequently, there is no danger of breakage if it is removed from the stove while still hot and placed in a pan of water for washing. Moreover, the body of the plate 10 is of sufficiently low thermal conductivity as to form an effectual barrier against a downward flow or loss of heat from the food being broiled. A food supporting plate having these characteristics can be made of fused heat insulating material and may, for example, be made of ceramic material covered with a glazed vitric shell 12 (Fig. 2) covering the entire outer surface of the plate. This vitric shell must withstand very high temperatures without deterioration because the backing of ceramic, forming as it does a heat barrier, traps the heat at the surface of the plate so that unusually high temperatures are reached on this surface. This action materially aids in the broiling operation since the temperature of the plate surface is great enough to sear the bottom of a steak, for example so that it can be broiled without turning. The vitric glaze is preferably fused on at a temperature of about 2600° F., a temperature well in excess of any likely to be encountered in use. The glaze or shell 12 is such as to have a coefficient of thermal expansion substantially equal to that of the body of the ceramic plate 10 or at least sufficiently close to avoid setting up internal strains sufficient to crack either the glaze or the body of the ceramic. A glazed ceramic material suitable for the present purpose and having the various characteristics outlined above is sold on the market under the trade name "Parkerite."

To facilitate draining of juice from meat or the like being broiled on the plate 10 a series of drain grooves 13 are fashioned in its top surface with a proper slope for drainage, as for example, in the present instance, inwardly from the periphery to a central aperture 14. The grooves are generally rectangular in cross section and taper inwardly toward the hole 14, their shape being such, however, that the surface of the plate is free of undercuts in which food may become lodged. It will be noted that the area of the hole 14 is quite small as compared to the total area of the plate 10 so that in effect the plate presents a substantially imperforate cooking surface.

The pan 11 is generally square in shape being preferably fashioned as a stamping from sheet metal. Its margins are turned in as indicated at 15 (Fig. 2) to cover any raw or sharp edges at the periphery. The center portion of the pan is dished downwardly as indicated at 16 to form a drip collection receptacle underlying the plate 10. To support the plate 10 an annular ledge or shoulder 17 is formed around the periphery of the dished portion 16 and underlies the peripheral portion of the plate. The central portion of the plate 10 rests on a circularly arranged series of integral bosses 18 fashioned in the bottom of the pan 11.

Grease or juices draining into the dished portion 16 of the pan through the aperture 14 in the plate enter a comparatively cool zone in view of the presence of the heat insulating barrier covering the top of the receptacle. Though this zone is warm enough to keep the grease fluid, it is of low enough temperature that the grease will not burn and smoke up the bottom of the hearth.

The construction described lends itself to incineration of food particles left on the plate 10 after the broiled food is removed. The plate 10 described is amply capable of withstanding temperatures high enough to consume carbonaceous or volatile constituents of the food particles leaving only a fine ash to be brushed off. Also the plate 10 can be so easily removed from the supporting pan 11 and presents such smooth surfaces that washing or scrubbing it is a very simple matter. As previously noted the plate 10 can withstand extreme heat shocks so there is little or no danger breaking it even though its temperature be changed suddenly during washing. Removal of the plate 10 also completely exposes the surfaces of the pan 11 for scouring. Maintenance of the device in a sanitary condition is thus made easy.

In use the food support illustrated is slid into the broiler compartment of a stove with the side edges of the pan 11 resting on the usual side wall supporting guides or rails. Heat from the burner or other heating element in the broiler beats down on the food on the plate 10 quickly broiling it. Since the body of the plate has a low thermal conductivity, little heat passes through it but, instead, is trapped above it where it is effective in cooking. As a consequence, the surface of the plate is raised to a high temperature and a maximum over-all thermal efficiency is insured.

A modified form of broiler food support embodying the invention has been shown in Figs. 3 and 4. This device embodies a pan 11 identical in construction with that of Figs. 1 and 2 and consequently the same reference numerals have been used to identify its corresponding parts. On this pan is supported a plate 10ª generally like the plate 10 in that it has the same general physical characteristics as to material and may also be made of ceramic material covered with a vitric glaze 12ª. It differs from the plate 10 primarily in that it is sectionalized. Its disk shaped top surface is formed by three separable and substantially identical segments, which can be individually replaced if necessity demands.

To form drain spaces between the segments of the plate 10ª, small spacing bosses 19, here shown as two in number, are formed on a corresponding side edge of each segment. These bosses abut against the adjacent edge of the next segment, retaining the segments properly spaced. Finger holes are formed in the segmental sections of the plate 10ª as indicated at 20, these holes also serving incidentally for drainage. Additionally the slightly spaced noses of the segments permit drainage at the center of the plate.

The top surface of the plate 10ª is generally smooth and flat in contour. It is, however, sloped slightly toward the center (Fig. 4) and each of the segment top surfaces is sloped slightly laterally away from the radial center line thereof toward the drain spaces at its side edges.

In view of the character of the material of which the plate 10ª is constructed it performs while in use in substantially the same manner as the plate 10 heretofore described. It can be cleaned as readily, or in fact more easily than the plate 10, because of the separability of its segmental sections.

I claim as my invention:

1. In a broiler food support the combination of a plate made of fused heat insulating material presenting a moisture-impervious surface to receive directly on it food to be broiled, said plate being generally disk shaped in form and being made up of a plurality of sections having protrusions on their adjacent edges to space the same apart to form drainage openings between the sections, and means including a drip pan beneath the plate for supporting said plate sections in assembled relation.

2. A broiler food support comprising, in combination, a sheet metal pan having a dished central portion forming a drain receptacle, and a generally flat slab of fused ceramic material removably seated on said pan above said dished portion, presenting a top surface capable of withstanding extremely high temperatures to receive directly on it the food to be broiled, and also forming a heat insulating barrier overlying the contents of said drain receptacle.

3. A broiler food support comprising, in combination, a generally flat sheet metal pan having a dished central portion bordered by a ledge, a generally flat slab of fused ceramic material divided into a plurality of structurally separate sections each arranged with its outer portion seated on said ledge, and means forming legs supporting the inner portions of said sections spaced above said dished portion of the pan.

CLAUDE E. PARKER.